INVENTORS
R.E. KEELER
D.G. FREEMAN
R. VAN BLERKOM
BY James David Jacobs
AGENT

Oct. 14, 1969 R. E. KEELER ET AL 3,473,132

DIGITAL DEMODULATOR

Filed July 27, 1967 4 Sheets-Sheet 3

United States Patent Office 3,473,132

Patented Oct. 14, 1969

3,473,132
DIGITAL DEMODULATOR

Robert E. Keeler, Baltimore, Don G. Freeman, Gaithersburg, and Richard Van Blerkom, Rockville, Md., assignors to International Business Machines Corporation, Armonk, N.Y., a corporation of New York Filed July 27, 1967, Ser. No. 656,493
Int. Cl. H03d *5/00*
U.S. Cl. 329—122 8 Claims

ABSTRACT OF THE DISCLOSURE

The invention pertains to a digital demodulator of a received analog waveform including a quantizing sampler which produces quantized digital signals from the received analog waveform, a robust amplitude and noise estimator receiving signals from said sampler and producing a signal representative of the amplitude to noise ratio of said received analog waveform, and a robust information extractor receiving signals from said quantizing sampler and said robust amplitude to noise estimator and producing a signal representative of the information on said analog waveform.

GOVERNMENT CONTRACT

The invention herein was made in the course of or under a contract or subcontract thereunder with the Air Force.

BACKGROUND OF THE INVENTION

Field of the invention

This invention relates to communication receivers and signal demodulators. More specifically, this invention relates to the demodulation of modulated waves by purely digital techniques which are not analogous to operations performed by an analog demodulator.

Description of the prior art

Signal demodulators (also known as communication receivers) come in many forms. For example, the common analog radio receiver is such a demodulator. However, because such a receiver is an analog device, the receiver's performance is sensitive to such parameters as temperature, component aging, humidity, etc. Moreover, a practical disadvantage is that it is difficult to construct an analog device linear over large frequency deviations. A further disadvantage of analog receivers has been that their performance is sensitive to changes in the noise statistics. That is, when different noise distributions are superimposed upon the information signal, the analog demodulator reacts differently to each.

To overcome these disadvantages inherent in an analog designed device, digital techniques have been used. One such technique has been the optimum digital receiver. This technique utilizes a completely digital system best suited to the noise distribution. For example, if a transmission method such as frequency shift keying, which utilizes a discrete frequency for each unit in the digital code, is used, detection is accomplished by digital matched filters. (See A. T. Viterla, Principle of Coherent Communication, McGraw-Hill, 1966, chap. 7.) These techniques have the disadvantage of being inherently complex and dependent upon the nature of noise superimposed upon the information signal.

Other digital techniques have also been suggested. Reference should be made to the IEEE Transactions on Information Theory of July '66, vol. IT–12, No. 3, for another digital approach. However, this approach still tries to solve the demodulation problem by using optimum digital techniques.

BRIEF SUMMARY OF THE INVENTION

The invention is a demodulator which receives analog signals and demodulates them digitally. The invention first samples the analog waveform and then quantizes these samples. By the term "quantizes" it is meant that the sample of the analog waveform is given one of a finite set of values. The digital signal is then fed into a robust amplitude and noise estimator and a robust information extractor. The term "robust" connotes a device that is relatively insensitive to the noise distribution on the received analog waveform. The robust amplitude and noise estimator produces signals that are on the average proportional to the amplitude-to-noise ratio and the amplitude of the received analogwaveform. Both these last mentioned signals and the quantized digital samples of the analog waveform are fed into the robust information extractor. This device, utilizing its input, produces a signal representative of the information contained in the received analog waveform. It will be assumed below that all signals are digital except for those which are expressly labeled otherwise.

The description below discloses in detail two embodiments of the broad invention, a phase medulation demodulator and a frequency modulation demodulator. The preferred embodiment of the frequency demodulator first samples and quantizes the received analog waveform. The received analog waveform is randomly sampled in pairs. That is, a first sample is taken at a random interval from the last. Then a second sample is taken a short fixed time afterwards. The amplitude and noise extractor of the frequency modulation demodulator contains a ranker which order the first sample of the last $n$ pairs of quantized digital samples. A range computer then computes the range of the ordered quantized digital samples. The signal produced by the range computer is fed into a function generator which produces a signal representative of the noise contained on the received analog waveform. The ordered quantized digital samples are also fed into a mode estimator. The mode of a series of values is defined as the value which would have the highest probability of occurrence given that series of values. It has been found that the mode of a given group of quantized random samples of an analog waveform has the property of being a representation of the amplitude of that analog waveform. The signal from the mode estimator (i.e., the amplitude) is divided by the signal from the function generator (i.e., the noise) which results in a signal representing the amplitude-to-noise ratio.

The quantized samples from the analog to digital converter are also fed into the robust information extrator. A subtractor computes the differences between successive pairs of quantized samples. A ranker then orders the last $n$ differences. A mode estimator computes the mode of these $n$ samples. The signal representing the mode of the last $n$ ordered quantized differences is fed into a function generator along with the signal representing the amplitude-to-noise ratio computed in the robust amplitude and noise estimator. A signal which is proportional to the amplitude times the frequency of the received analog waveform is then computed by the function generator based upon the two input signals. This signal produced by the function generator is then fed into a divider along with the signal representing the amplitude computed by the robust amplitude and noise estimator. The output of the divider is a signal representative of the transmitted analog message waveform.

Also included in the description below is a phase modulation demodulator. In this demodulator the quantizing sampler consists of two independent analog to digital converters. The first analog to digital converter is identical to that which is in the frequency modulation demodulator, i.e., the received analog waveform is sampled such that the waveform is sampled twice in a short interval, there being a random interval between sample pairs. The output of the first analog to digital converter is fed into the robust amplitude and noise estimator. The robust amplitude and noise estimator in the phase modulation demodulator is identical to the one in the frequency modulation demodulator.

The second analog to digital converter is synchronized to the hypothetical or nominal unmodulated received analog waveform. That is, the received analog waveform is sampled at intervals such that if the received analog waveform were unmodulated, samples would occur each half cycle at the same exact phase displacement. This second analog to digital converter only determines the sign of the received analog waveform at the sampled point. The signals representing the last $n$ samples are sumed; and the signal representing this sum is received by a function generator along with the signal representing the amplitude to noise ratio produced by the robust amplitude and noise estimator. Based upon these inputs the function generator generates a signal representative of the phase modulation of the received analog waveform.

Therefore, it is an object of this invention to produce a demodulator which is relatively insensitive to noise distribution changes.

Further, it is an object of the invention to produce such a noise distribution insensitive demodulator using digital devices.

Another object of the invention is to produce a demodulator which can be adapted to be used in a number of different modulation modes.

Another object of the invention is to produce such a demodulator which can operate in the frequency modulation mode.

Another object of the invention is to produce a demodulator which can operate in the phase modulation mode.

DETAILED DESCRIPTION OF INVENTION

Figure 1:
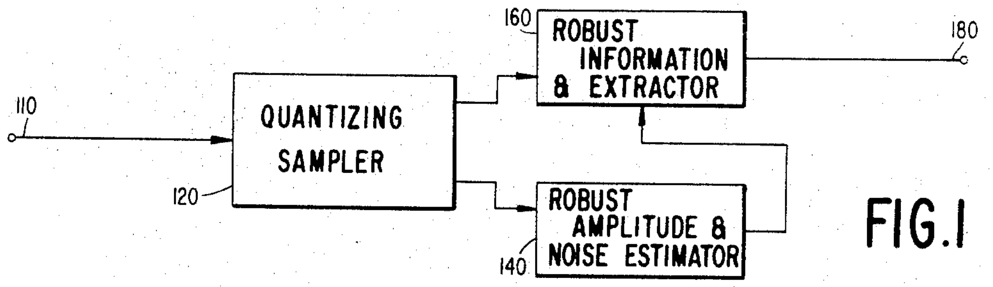
FIGURE 1 is a block diagram of the invention.

Referring to FIG. 1 the input 110 is connected to quantizing sampler 120. The output of quantizing sampler 120 is electrically connected to the input of the robust amplitude and noise estimator 140 and the robust information extractor 160. The output of robust amplitude and noise estimator 140 is connected to a second input of the robust information extrator 160. The output 180 is connected to the output of robust information extractor 160.

In operation a modulated analog waveform is received at input 110. As a practical consideration, if the frequency of the received analog waveform is unsuitable for the digital circuitry, the frequency can be modified by conventional analog techniques to one more suitable. Hereinafter the description will assume that the received analog waveform is suitable for handling by the invention.

Quantizing sampler 120 samples the incoming waveforms and then quantizes the samples. As mentioned above the term quantizing connotes the selection of a discrete value for each sample of the received analog waveform. It will be assumed that all samples will be quantized to the nearest lower voltage level. The quantized sample is then given a digital representation and put on the output of quantizing sampler 120.

Robust amplitude-to-noise estimator 140 receives the quantized digital sample and produces a signal representing an estimate of the amplitude-to-noise ratio of the received analog waveform.

The robust information extractor 160 receives the signals generated by robust amplitude and noise estimator 140 and quantizing sampler 120. With this input the robust information extractor 160 produces a signal on output 180 representative of the information contained on the received modulated analog waveform.

Figure 2:
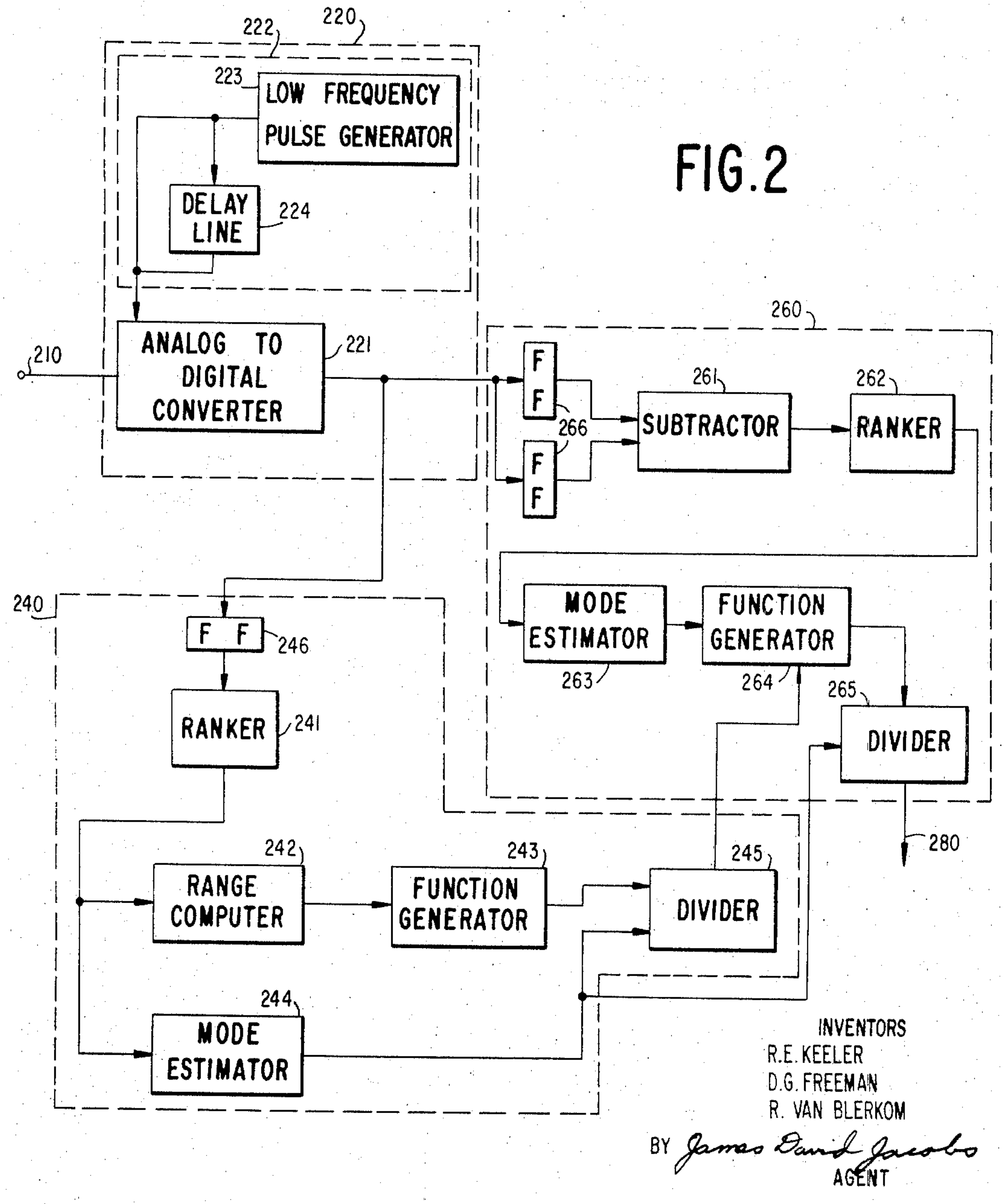
FIGURE 2 is a block diagram of the preferred emmodiment of a frequency modulated receiver built according to the invention as illustrated in FIGURE 1.

Referring to FIG. 2 the quantizing sampler 220 includes an input 210 into the analog to digital converter 221. Analog to digital converters are well known in the art. For example, the analog to digital converter shown on p. 27 of A–D Conversions Handbook, by Digital Equipment Corporation, Maynard, Mass., could be used as the analog to digital converter 221. Analog to digital converter 221 has the characteristics of sampling the waveform, quantizing it, and converting it into a binary code. The sampling of the analog to digital converter 221 is controlled by pulses which are generated by clock 222. Clock 222 contains a low frequency pulse generator. The frequency of this pulse generator is so slow with respect to that of the received analog waveform that the pulses can be assumed to be random with respect to the received analog waveform.

Low frequency pulse generator 223 is connected to the output of clock 222. Also the output of low frequency pulse generator 223 is connected to the delay line 224. The output of the delay line 224 is also connected to the output of clock 222. The length of the time of delay of delay line 224 is small compared with the period of low frequency pulse generator 223. Thus, the net output of clock 222 is that low frequency pulse generator 223 and delay line 224 combine to produce randomly spaced pairs of pulses, the pulses within the pair separated by a fixed relatively small interval of time.

Figure 3:
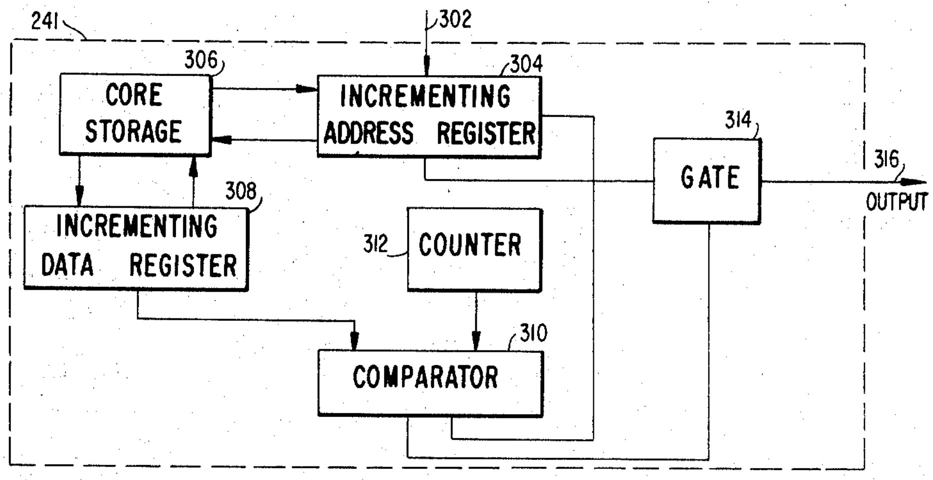
FIGURE 3 is a preferred embodiment of a ranker.
Figure 5:
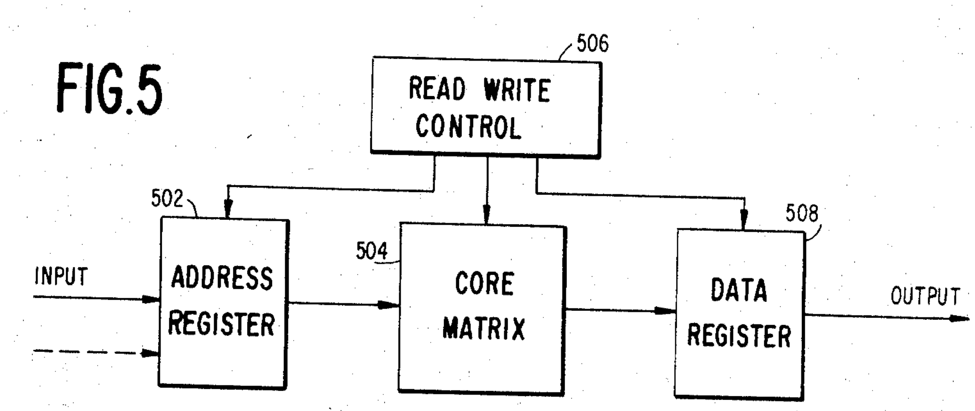
FIGURE 5 is a preferred embodiment of the function generator.

The quantizing digital samples from the analog to digital converter 221 are fed into flip-flop 246 located in the robust amplitude and noise estimator 240. Flip-flop 246 allows every other sample generated by the analog to digital converter 221 to be fed into the ranker 241. Ranker 241 orders the last $n$ quantized digital samples generated by analog to digital converter 221. A preferred embodiment for ranker 241 is shown in FIG. 3. The ordered samples from ranker 241 are fed into range computer 242. Range computer 242 computes the spread between the largest and smallest numerical values of the quantized samples. Range computers are well known in the art. For example, range computer 242 may consist of a device which detects the largest and smallest values contained in ranker 241; and subtracts these two values. The range of the ordered digital quantized samples is fed into the function generator 243. A preferred embodiment for the function generator 243 is shown in FIG. 5. The function generator produces an output representative of the noise on the received analog waveform according to the ordered quantized digital samples.

Figure 4:
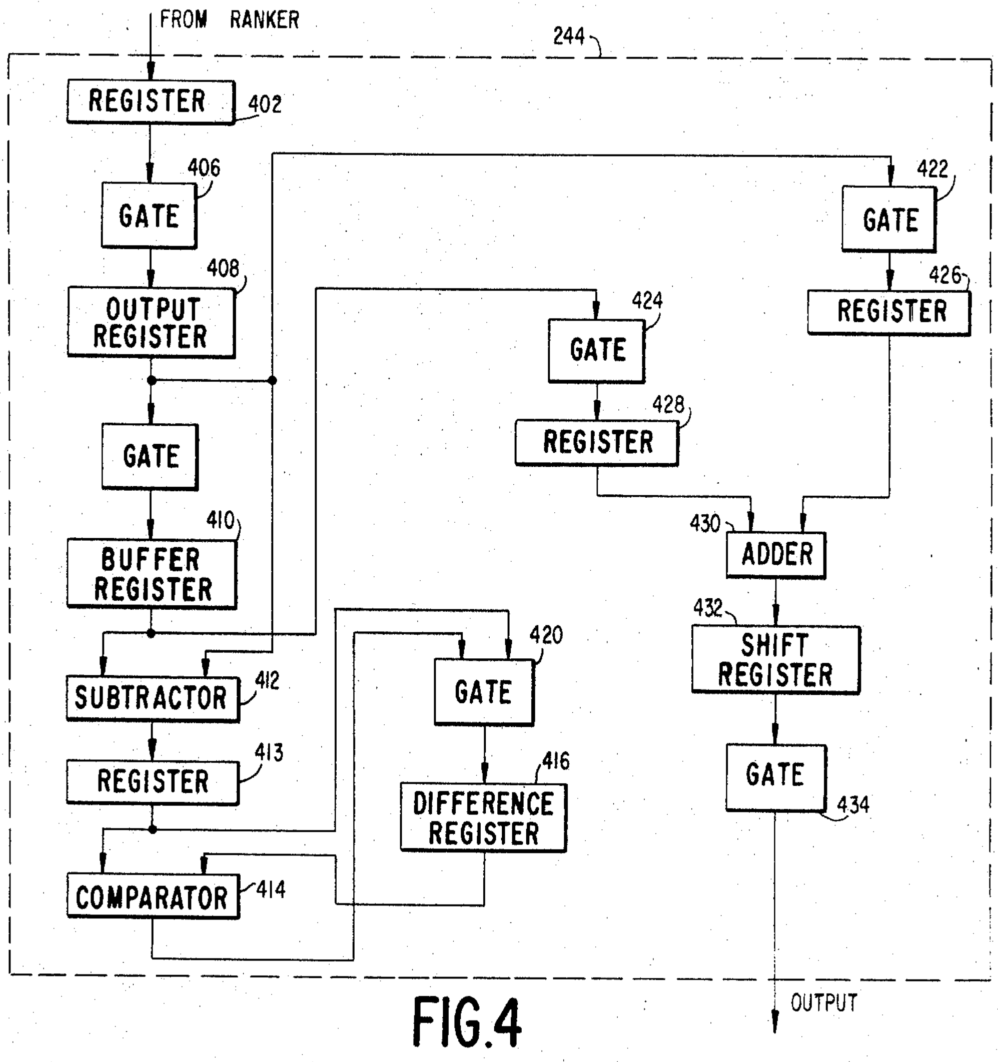
FIGURE 4 is the preferred embodiment of the mode estimator.

The ordered quantized digital samples from ranker 241 are also fed into the mode estimator 244. A preferred embodiment of mode estimator 244 is shown in FIG. 4. It has been found that the mode of the rank quantized digital samples is proportional to the amplitude of the received analog waveform.

The output of function generator 243 and mode estimator 244 are fed into divider 245. Divider 245 divides the output of function generator 243 into the output of mode estimator 244 and results in a signal on the output of divider 245 proportional to the amplitude-to-noise ratio.

The quantized digital samples from analog to digital converter 221 are also fed into the flip-flops 266 in the robust information extractor 260. The flip-flops 266 place alternate quantized digital samples from the analog to digital converter 221 into the subtracand and subtractor registers in subtractor 261, respectively. The output of the subtractor 261 is representative of the difference between successive samples and is fed into ranker 262. The output of ranker 262 is fed into mode estimator 263. Mode estimator 263 is similar in operation and construction to that of mode estimator 244 which is illustrated in FIG. 4. The output of mode estimator 263, a signal representative of the quantized digital sample, is fed into function generator 264. The other input of function generator 264 is the signal from divider 245, a signal representative of the amplitude to noise ratio. Function generator 264 is illustrated in FIG. 5. The output of function generator 264 is a signal representative of the amplitude times the frequency which is fed into divider 265. The other input of divider 265 is the signal from mode estimator 244, a signal representative of the amplitude of the received analog waveform. Divider 265 divides the output of function generator 264 by the output of mode estimator 244. The output of divider 265 is a signal proportional to the frequency of the received analog waveform.

As an illustration of the operation of the frequency modulation demodulator of FIG. 2 it will be assumed an analog waveform is received identical to the one illustrated in FIG. 9. Low frequency pulse generator 223 produces pulses at times $t_1$, $t_2$, $t_3$, etc. Moreover, delay line 224 delivers an additional pulse to the analog to digital converter 221 a time $\Delta$ after the pulse from the low frequency pulse generator. It is to be understood that FIG. 9 is contracted in relationship to the frequency of the waveform for illustration purposes. The output of analog to digital converter 221 for an input signal as illustrated in FIG. 9 is given below in Table I. The output has been quantized to the nearest whole number. The sampled value is then converted into a digital form. In the preferred embodiment the digital form is a binary code as illustrated by the third line in Table I.

TABLE I

| | $t_1$ | $t_1+\Delta$ | $t_2$ | $t_2+\Delta$ | $t$ |
|---|---|---|---|---|---|
| Quantized value | 9 | 1 | 35 | 27 | 40 |
| Output (binary) | 0001001 | 0000001 | 0100011 | 0011011 | 0101000 |

| | $t_3+\Delta$ | $t_4$ | $t_4+\Delta$ | $t_5$ | $t_5+\Delta$ |
|---|---|---|---|---|---|
| Quantized value | 43 | 1 5 | 61 | 83 | 73 |
| Output (binary) | 0101011 | 0001111 | 0111101 | 1010011 | 1001001 |

The output of the analog to digital converter 221 is fed into flip-flop 246 which allows every other sample to pass. This is illustrated in line 2 of Table II. The numbers in Table II are in decimal form for ease of understanding; it is to be understood that the preferred embodiment would employ the numbers in a binary form. Flip-flop 246 is employed to obtain a more random sample distribution by insuring that successive outputs of flip-flop 246 are statistically independent. The output of flip-flops 266 is fed into ranker 241 which orders the last $n$ received samples. Assuming that $n$ is equal to 5, the output of ranker 241 is shown as line 3 in Table II.

TABLE II

| | | | | | | | | | | |
|---|---|---|---|---|---|---|---|---|---|---|
| Output of A–D converter | 9 | 1 | 35 | 27 | 40 | 43 | 15 | 61 | 83 | 73 |
| Output of flip-flop 266 | 9 | | 35 | | 40 | | 15 | | 83 | |
| Ordered sample | 83 | | 40 | | 35 | | 15 | | 9 | |

The output of ranker 241 is received by mode estimator 244. As described below in connection with the detailed description of mode estimator 244 a signal is produced by said mode estimator 244 representing the mode of the last $n$ samples. As described below in the detailed description of mode estimator 244, it has been found that the mode of a series of random samples is representative of the signal contained on a modulated analog waveform. Also, as described in the detailed description of mode estimator 244, the computer value of the mode of the series of samples in Tables I and II is 37½.

The output of ranker 241 is also fed into the range computer 242. In accordance with the detailed description of the range computer 242 below, the range computed from the example is 74.

The output of range computer 242 is fed into the function generator 243. In accordance with the detailed description of function generator 243 the output of said function generator is proportional to the noise superimposed upon the received modulated analog waveform. The output of mode estimator 244 is divided by the output of function generator 243 in divider 245. Thus, the output of divider 245 is a signal representative of the amplitude to noise ratio of the received analog waveform. This is because the output of function generator 243 is a signal proportional to the noise and the output of mode estimator 244 is a signal proportional to the amplitude.

Signals from the analog to digital converter 221 are also fed into flip-flops 266 and 267. Flip-flop 266 places the first quantized digital signal into the minuend register in substractor 261 and flip-flop 267 puts the second quantized digital sample in the subtrahend register in subtractor 261. Thus, in our example, the sample at $t_1$ would go into the minuend register and the sample at $t_1+\Delta$ would go into subtrahend register. Substractor 261 takes the difference of the pair of signals and produces a signal representative of the difference. These last $n$ signals representing the last $n$ differences are ranked in ranker 262. Mode estimator 263 computes the mode of the rank signals and produces a signal which is fed into function generator 264 representative of the mode of the received analog waveform. Also fed into function generator 264 is the signal from divider 245 representing the amplitude-to-noise ratio of the received analog waveform. Based upon these inputs function generator 264 computes a signal representative of the amplitude times the frequency. This can be accomplished because it has been found that the amplitude times the frequency is a function of the mode calculated in the mode estimator 263. The operation of the function generator is described in more detail below. The signal from the function generator 264 representing the amplitude times the frequency is fed into divider 265 along with the signal representing the estimate of the amplitude for mode estimator 244. The divider 265 divides the signal from the function generator 264 by the signal from the mode estimator 244 and produces an output representative of the frequency of the received analog waveform. The operation of the robust information extractor 360 is detailed below in Table IV for the hypothesized waveform values used in Table I. The first line of Table IV represents the quantized values in decimal form of the signals produced by analog to digital converter 221. Ranker 262 receives the signals produced by subtractor 261 and produces signals representing the ordered differences as shown in line 3, Table IV. As explained below mode estimator 263 calculates the mode of the ordered differences and produces a signal representative of their mode. See line 4, Table IV.

Both robust information extractor 260 and robust amplitude and noise estimator 240 in the preferred embodiment require that the received frequency modulated analog waveform be sampled randomly. Reference is made to the above mentioned Groginsky article for a further description of the statistics involved.

Referring now to FIG. 3, a preferred embodiment of ranker 241 is illustrated. As mentioned above ranker 241 is identical to ranker 262. The input 302 of ranker 241 accepts the quantized samples and places them in the incrementing address register 304. The quantized sample determines a unique address in core storage 306. The contents of the unique address specified by the quantized sample in register 304 is read out and placed into incrementing data register 308. Incrementing data register increases the value of the contents read into it by one and places that value back into the same unique address in core storage 306. Thus, for every quantized sample there is a unique address in core storage 306; the contents of that unique address specifying the number of occurrences of that quantized sample.

When the series of *n* samples have been placed into core storage 306, they are read out. This is accomplished by having the incrementing address register first address the lowest sample value. The value contained in that unique position in core storage 306 is read into incrementing data register 308. The contents of incrementing data register 308 are compared by comparator 310 to the content of counter 312. Counter 312 increases from zero by steps of one until its value is equal to the value of the signal stored in 308. For every mismatch register by comparator 310 a signal appears on output 313 of comparator 310. This causes gate 314 to open, allowing the address stored in incrementing address register 304 to appear at the output 316. The sequence of addresses thus produced at 316 comprise the desired ordered samples, in order of increasing size.

When the comparator 310 registers a match a pulse appears on comparator output 318. This causes incrementing address register 304 to increment one address, causing the next highest quantized sampling level to be read out of core storage 306 into incrementing data register 308. As a result, the number of times that a signal representing an address in core storage 306 appears at output 316 is governed by the numerical value stored in that address.

Referring now to FIG. 4 a detailed embodiment of mode estimator 244 is shown. As mentioned above mode estimator 244 is identical to mode estimator 263. The ordered samples from the ranker are placed into register 402 which acts as a storage register. Under the appropriate timing control (not shown in the drawings) gate 406 sequentially dumps the contents of register 402 into output register 408. The previous ordered quantized sample has been stored in buffer register 410. Subtractor 412 subtracts the contents of register 408 from 410. The difference generated by subtractor 412 is stored in register 413. The difference stored in 413 is compared with the contents of difference register 416, the smallest previous difference, by comparator 414. If the contents of difference register 416 are greater than that of register 413 gate 420 dumps the contents of register 413 into difference register 416 and thereby stores the smallest difference of the examined samples in the last *n* ordered quantized samples. Simultaneously, gates 422 and 424 dump the contents of registers 408 and 410 into registers 426 and 428, respectively, and thereby store the two quantized digital samples associated with the smallest difference. When the *n* samples have been examined and the smallest difference between successive ordered samples has been determined, adder 430 produces a sum of the contents stored in registers 426 and 428 which is placed in shift register 432. Shift register 432 shifts the sum produced by adder 430 one place to the right, thereby accomplishing a division by two. Therefore, the output of shift register 432 is effectively the average of the contents of registers 426 and 428. When the *n* samples have been examined gate 434 dumps the contents of shift register 432 into the function generator 264 (see FIG. 2).

As mentioned above, reference should be made to Dalenius, Tor, Journal of the Royal Statistical Society, 1965, part 1, p. 110 ff:. for a detailed mathematical explanation of why the above described circuit results in an estimate of the mode of the input quantized sampels. The basic explanation is that the mode (the value that is most likely to occur next in a series of given values) is approximately given by the value half-way between the two values among the set of given values which produce the smallest difference.

Table III contains a tabulation of the calculations of the mode to determine the amplitude of the analog waveform; Table IV contains a tabulation of the calculations of the mode of the differences of the pairs of quantized samples. Both tables utilize the hypothesized numbers of FIGURE 9.

TABLE III

| | | | | | | | | | |
|---|---|---|---|---|---|---|---|---|---|
| Ordered sample | 83 | | 40 | | 35 | | 15 | | 9 |
| Difference | | 43 | | 5 | | 20 | | 6 | |

Smallest difference=5.
½ smallest difference=2½.
Mode=37½.

TABLE IV

| | $t_1$ | $t_1+\Delta$ | $t_2$ | $t_2+\Delta$ | $t_3$ | $t_3+\Delta$ | $t_4$ | $t_4+\Delta$ | $t_5$ | $t_5+\Delta$ |
|---|---|---|---|---|---|---|---|---|---|---|
| Quantized values | 9 | 1 | 35 | 27 | 40 | 43 | 15 | 61 | 83 | 73 |
| Differences | 8 | | 8 | | −3 | | −46 | | 10 | |
| Ordered differences | 10 | | 8 | | 8 | | −3 | | −46 | |
| Mode of differences | | | | 8 | | | | | | |

Figure 7:
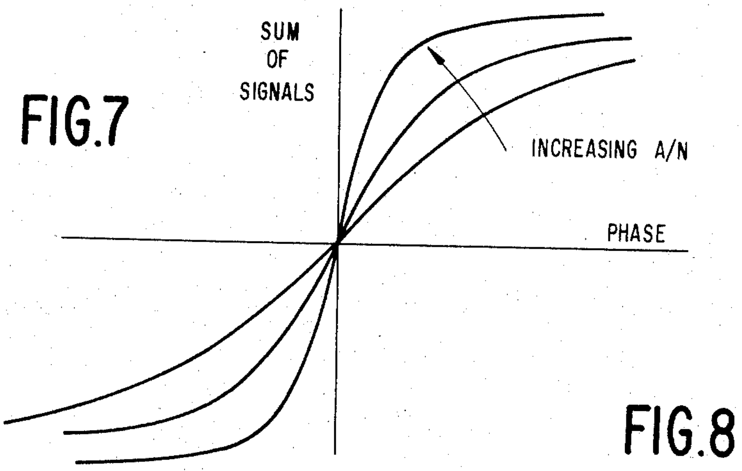
FIGURE 7 is a graph of the function generated in function generator 644.
Figure 8:
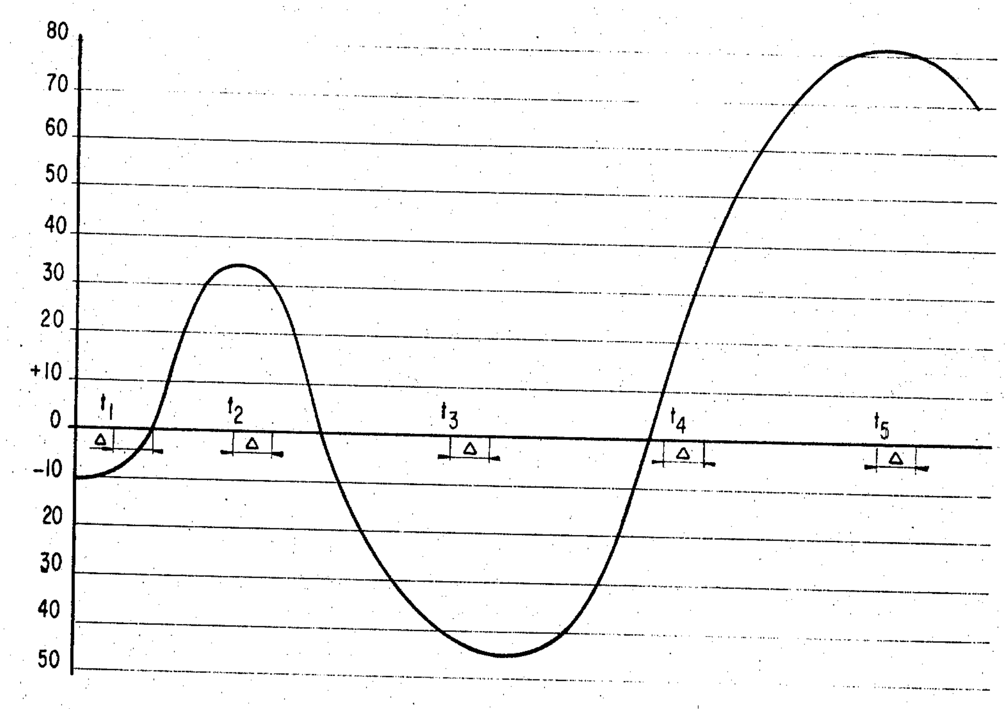
FIGURE 8 is a graphical representation of a modulated received analog waveform.

Referring to FIG. 5 a preferred embodiment of the generalized function generator used in the invention is illustrated. The function generator in FIG. 5 consists of an address register 502 which has at least one input. When the function generator illustrated in FIG. 5 is to be used as function generator 243 it has one input, when it is to be used as function generator 264 or function generator 664, address register 502 has two inputs. These inputs determine a unique address in the core storage 584. Under control of read/write control 506 when an input is placed into address register 502 the unique address thereby specified in core storage 504 is read out and the information stored in data register 508. As can be seen by this description, preferred function generator 504 is known in the art as a "look-up memory." The functions to be stored within the core storage 504 are determined by empirical experiments. For example, with respect to function generator 233 it has been determined when the range of a group of *n* ordered samples is determined, a specific single valued empirical function will determine the noise on the received analog waveform from which the *n* quantized samples were derived. Similar statements are true for function generator 264 and function generator 664. FIG. 7 is a graph depicting the general conformal shape of the function to be stored in function generator 664.

Figure 6:
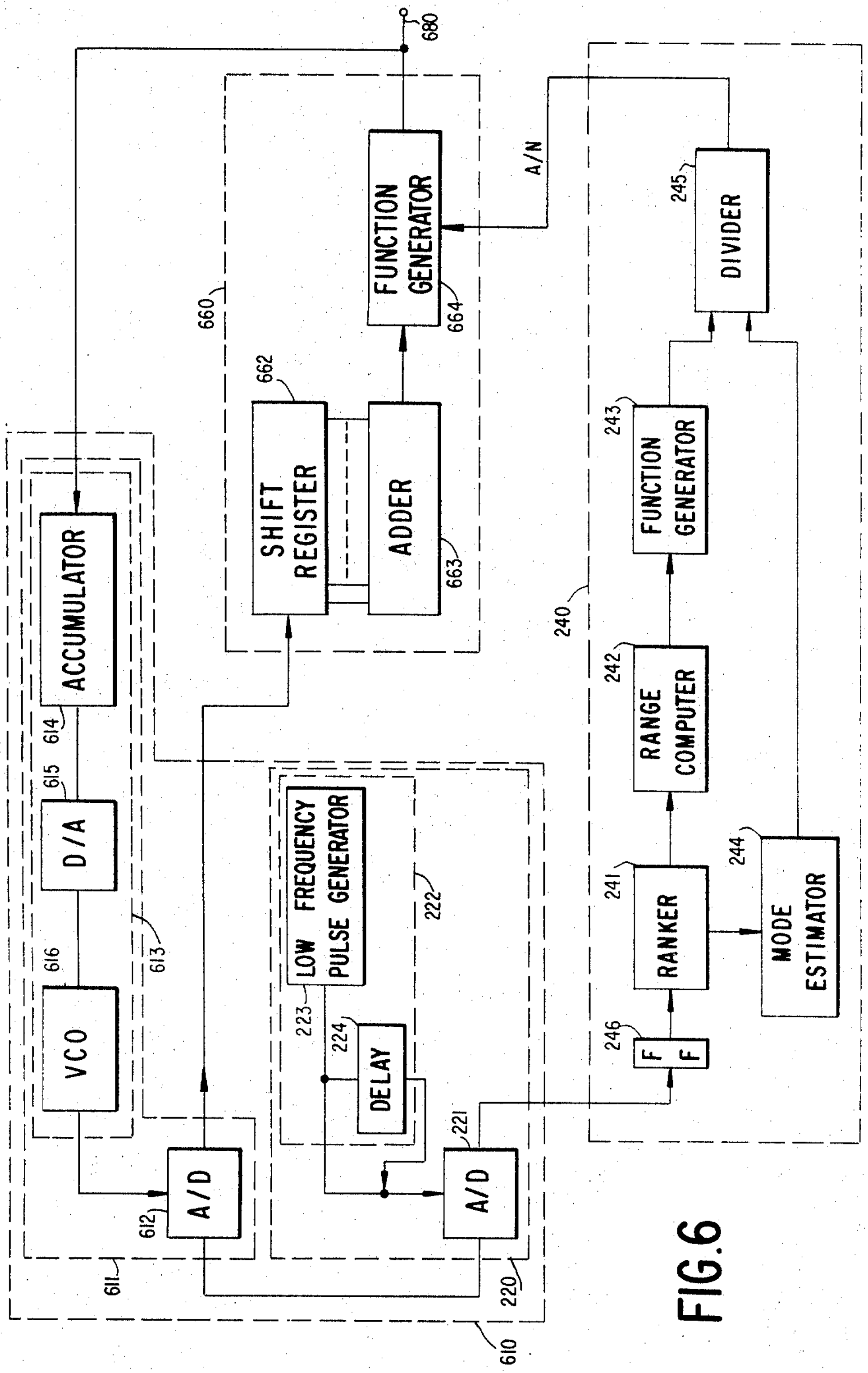
FIGURE 6 is a preferred embodiment of the phase modulation demodulator built according to the invention as illustrated in FIGURE 1.

Referring now to FIG. 6 the preferred embodiment of a phase modulation demodulator is shown constructed along the lines of the invention as shown in FIG. 1. Elements that are the same in FIG. 6 and in FIG. 2 have been given the same reference numerals. Quantizing sampler 610 has within it two independent quantizing samplers 220 and 611. It is noticed that quantizing sampler 220 is the same as that in FIG. 2 and will not be described further. Quantizing sampler 611 has a one bit analog to digital converter which takes the received analog waveform and produces one digital bit representing whether the waveform when sampled was positive or negative. One bit analog digital converters such as analog digital converter 612 are well known in the art. The sampling time of analog to digital converter 612 is determined by clock 613. The sampling pulse produced by clock 613 is synchronized to the unmodulated analog waveform. This is accomplished by accumulating the modulator over a period of time in accumulator 614.

The digital sum stored in the accumulator is converted into an alalog signal by digital to analog converter 615.

Digital to analog converters 615 is connected to a voltage controlled oscillator 616. Voltage controlled oscillator 616 produces a pulse which is fed into one bit analog to digital converter 612 and causes analog to digital converter 612 to sample the received analog waveform. If clock 613 is so synchronized that it produces two pulses (or more) per period for the unmodulated received analog waveform, sign-changing means must follow the one bit analog to digital converter 612. These sign-changing means must be inserted so that function generator 664 will accurately compute the desired function.

The output of quantizing sampler 220 is fed into the robust amplitude and noise estimator 240. Robust amplitude and noise detector 240 is identical to that in FIG. 2 and will not be further described here.

The output of quantizing sampler 611 is fed into the robust information extractor 660. The one bit digital sample produced by analog to digital converter 612 is fed into shift register 662.

Shift register 662, which is $n$ bits long, accepts the sequence of binary digital bits produced by analog to digital converter 612 serially. Therefore, for every new output of sign alternator 661, the oldest sample stored in shift register 662 is shifted out. The contents of shift register 662 are added by parallel adder 663. The sum produced by parallel adder 663 is an input to function generator 664. The other input to function generator 664 is the output of divider 245.

As mentioned above, FIGURE 7 displays the function produced by function generator 664. From FIGURE 7 it is seen that the phase is a single-valued function of the signal to noise ratio (represented by signal produced by divider 245) and the sum of the last $n$ sines (represented by a signal from parallel adder 663). Thus, the output of function generator 664 is a signal representative of the phase modulation of the received analog waveform.

Summarizing, quantizing sampler 320 and robust amplitude and noise extractor 240 operate and cooperate together as they did in FIGURE 2. Similarly, the output of robust amplitude and noise estimator 240 is exactly the same as in FIGURE 2, i.e., a signal proportional to the amplitude to noise ratio.

The one bit analog to digital converter 612 samples the received analog waveform once every cycle synchronized with the unmodulated received analog waveform. This is accomplished by clock 613 which produces a pulse every cycle. Accumulator 614 accumulates the deviations of the phase produced at output 680 over many phase estimates. This results in a sum stored in 614 which is proportional to the amount which the clock 613 has deviated from the correct sampling point. This digital sum stored in accumulator 614 is converted into an analog signal by digital to analog converter 615. Digital to analog converter 615 controls the voltage controlled oscillator 616. That is, digital to analog converters 615 correct the frequency of the pulses generated by the voltage controlled oscillator 616. Essentially the clock 613 forms a phase locked loop with the analog to digital converter 612 and the output 680.

The analog to digital converter 612 determines the sign of the sampled received analog waveform.

The last $n$ samples out of analog to digital converter 612 are accumulated by shift register 662 and added by parallel adder 663. This sum together with the signal representing the amplitude to noise ratio from divider 245 is an input to function generator 664. The function stored in function generator 664 is represented in FIGURE 7. It is seen by this graph that for every amplitude to noise ratio and sum, a unique phase angle is defined. The signal representing the phase modulation is put onto output 680 and also fed back into accumulator 614.

The results of the above preferred embodiments of the invention can be improved in many environments by averaging certain signals representing important quantities. For example, the signal produced by divider 245 representing the amplitude to noise ratio could be averaged over a period of time. This would result in a more stable, i.e., less frequently varying, amplitude to noise ratio. Which signals should be varied, for what period of time, and under what circumstances have to be determined by the environment in which the invention is placed by ordinarily good engineering practice.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A digital demodulator of a received analog waveform including:
   - a quantizing sampler producing quantized digital signals from the received analog waveform;
   - a robust amplitude and noise estimator receiving the samples from said sampler and producing a signal representative of the amplitude to noise ratio of said received analog waveform; and
   - a robust information extractor receiving signals from said quantizing sampler and said robust amplitude and noise estimator and producing a signal representative of the information on said analog waveform.

2. A frequency modulation demodulator including:
   - a quantizing sampler including:
     - a clock producing random time signals;
     - a quantizing analog to digital converter receiving a modulated analog waveform and producing quantized digital signals representative of said modulated analog waveform when a timing pulse from said clock is received;
   - a robust amplitude and noise estimator including:
     - a flip-flop receiving the quantized digital signals from said quantizing analog to digital converter and passing every other quantized digital signal;
     - a first ranker receiving the quantized digital signals passed by said flip-flop and ordering the last $n$ of said quantized digital signals;
     - a first mode estimator receiving said $n$ ordered quantized digital samples from said first ranker and producing an output representative of the mode of said $n$ ordered samples;
     - a range computer receiving said $n$ ordered samples from said first ranker and producing a signal representative of the range of said $n$ ordered samples;
     - a first function generator receiving the signal representing the range of said $n$ ordered samples from said range computer and producing an output representative of the noise on the received modulated analog waveform;
     - a first divider receiving said output from said first function generator and said first mode estimator and producing a signal representative of the ratio of the amplitude to the noise;
   - a robust information extractor:
     - a subtractor receiving the samples from said analog to digital converter and producing a signal representative of the difference between successive pairs of samples from said analog to digital converter;
     - a second ranker receiving and ordering $n$ successive samples received from said subtractor;
     - a second mode estimator receiving said $n$ ordered samples from said second ranker and producing an output representative of the mode of said $n$ ordered samples;
     - a second function generator receiving said signals from said second mode estimator and the signal from said first divider and producing a signal representative of the frequency times the amplitude of said received modulated analog waveform; and a second divider receiving said signals produced by said second function generator and said first mode estimator for producing a signal representative of the frequency of said received analog waveform.

3. A frequency modulation demodulator as in claim 2 wherein the clock includes:

a pulse generator whose frequency of generation is low in comparison with the frequency of the received modulated analog waveform;

a delay line connected to the output of said pulse generator;

and an output connected both to the output of said pulse generator and said delay line.

4. A phase modulation demodulator including:

a quantizing sampler including:

a first clock producing random time signals;

a quantizing analog to digital converter receiving a modulated analog waveform and producing quantized digital signals representative of said modulated analog waveform when a time signal from said first clock is received;

a second clock producing pairs of time signals, the first signal synchronized with the unmodulated received analog waveform and the second time signal a fixed period after the first time signal;

a second analog to digital converter receiving said modulated analog waveform producing a signal representative of the sign of said modulated analog waveform when a time signal from said second clock is received;

a robust amplitude and noise estimator including:

a flip-flop receiving the quantized digital signals from said quantizing analog to digital converter and passing every other quantized digital signal;

a first ranker receiving the quantized digital signals passed by said flip-flop and ordering the last *n* of said quantized digital signals;

a first mode estimator receiving said *n* ordered quantized digital samples from said first ranker and producing an output representative of the mode of said *n* ordered samples;

a range computer receiving said *n* ordered samples from said first ranker and producing a signal representative of the range of said *n* ordered samples;

a first function generator receiving the signal representing the range of said *n* ordered samples from said range computer and producing an output representative of the noise on the received modulated analog waveform;

a first divider receiving said output from said first function generator and said first mode estimator and producing a signal representative of the ratio of the amplitude to the noise;

a robust information extractor including:

a shift register storing the last *n* signals from said second analog to digital converter;

an adder adding the signals stored in said shift register;

and a second function generator receiving the signal from said parallel adder and said first divider producing a signal representative of the phase of said modulated analog waveform.

5. A frequency modulation demodulator as in claim 4 wherein the first clock includes:

a pulse generator whose frequency of generation is low in comparison with the frequency of the received modulated analog waveform;

a delay line connected to the output of said pulse generator;

and an output connected both to the output of said pulse generator and said delay line.

6. A frequency modulation demodulator as in claim 5 wherein the second clock receives the signal from said second function generator and uses said signal as a synchronization means.

7. A phase modulation demodulator as in claim 6 wherein said second clock includes:

an accumulator receiving said signal from said second function generator and accumulates the total digital value of said signal over *m* signals;

a digital to analog converter receiving said digital signal from said accumulator and producing an analog signal representing said digital signal; and a voltage controlled oscillator receiving said analog signal from said digital to analog converter and utilizing this signal to synchronize its oscillatory frequency with that of the unmodulated analog waveform.

8. A phase modulation demodulator as in claim 4 wherein the adder is a parallel adder.

References Cited

UNITED STATES PATENTS

| | | | |
|---|---|---|---|
| 2,617,879 | 11/1952 | Sziklai | 328—14 X |
| 3,273,141 | 9/1966 | Hackett | 332—1 X |

ROY LAKE, Primary Examiner

L. J. DAHL, Assistant Examiner

U.S. Cl. X.R.

178—88; 329—104; 332—1